United States Patent
Berges

(10) Patent No.: US 8,450,632 B2
(45) Date of Patent: May 28, 2013

(54) BRAZING METHOD WITH APPLICATION OF BRAZING FLUX ON ONE SIDE OF A SECTION OF A FLAT TUBE FOR A HEAT EXCHANGER

(75) Inventor: Damien Berges, Yvre le Polin (FR)

(73) Assignee: Valeo Systemes Thermiques, Le Mesnil Saint Denis, Cedex (FR)

( * ) Notice: Subject to any disclaimer, the term of this patent is extended or adjusted under 35 U.S.C. 154(b) by 874 days.

(21) Appl. No.: 12/439,098

(22) PCT Filed: Jul. 24, 2007

(86) PCT No.: PCT/EP2007/057600
§ 371 (c)(1),
(2), (4) Date: Nov. 5, 2009

(87) PCT Pub. No.: WO2008/025616
PCT Pub. Date: Mar. 6, 2008

(65) Prior Publication Data
US 2010/0140227 A1 Jun. 10, 2010

(30) Foreign Application Priority Data
Aug. 28, 2006 (FR) .................... 06 07553

(51) Int. Cl.
*B23K 1/00* (2006.01)
(52) U.S. Cl.
USPC ....................................... 219/85.22
(58) Field of Classification Search
USPC ................. 219/85.1, 85.21, 85.22
See application file for complete search history.

(56) References Cited

U.S. PATENT DOCUMENTS

| 5,174,490 A | 12/1992 | Koisuka et al. |
| 5,307,870 A * | 5/1994 | Kamiya et al. ............... 165/173 |
| 5,544,698 A | 8/1996 | Paulman |
| 6,234,243 B1 | 5/2001 | Murching et al. |

FOREIGN PATENT DOCUMENTS

| GB | 2334531 A | 8/1999 |
| JP | 2000061629 A | 2/2000 |
| JP | 2003181629 A | 7/2003 |
| JP | 2004025297 A | 1/2004 |
| JP | 2004347314 A | 12/2004 |
| WO | WO 0224390 A1 | 3/2002 |
| WO | WO 2006041210 A1 | 4/2006 |

OTHER PUBLICATIONS

English language translation and abstract for JP 2000-061629 extracted from PAJ database, dated Nov. 13, 2009, 34 pages.
English language translation and abstract for JP 2003-181629 extracted from PAJ database, dated Nov. 13, 2009, 68 pages.
English language translation and abstract for JP 2004-025297 extracted from PAJ database, dated Nov. 13, 2009, 124 pages.
English language translation and abstract for JP 2004-347314 extracted from PAJ database, dated Nov. 13, 2009, 46 pages.
PCT International Search Report for PCT/EP2007/057600, dated Oct. 19, 2007, 3 pages.

* cited by examiner

*Primary Examiner* — Chandra Chaudhari
(74) *Attorney, Agent, or Firm* — Howard & Howard Attorneys PLLC

(57) ABSTRACT

A process for brazing flat tubes (10) deposits a layer (40) of brazing flux on one side of an edge (11) of the flat tubes (10). The flat tubes (10) are part of a heat exchanger which has particular application to heat exchange systems in automobiles.

14 Claims, 1 Drawing Sheet

BRAZING METHOD WITH APPLICATION OF BRAZING FLUX ON ONE SIDE OF A SECTION OF A FLAT TUBE FOR A HEAT EXCHANGER

RELATED APPLICATIONS

This application claims priority to and all the advantages of International Patent Application No. PCT/EP2007/057600, filed Jul. 24, 2007 which claims priority to French Patent Application No. FR 06/07553, filed on Aug. 28, 2006.

The present invention relates to a process for brazing tubes.

One particularly advantageous application of the invention is in the field of heat exchange systems for automobiles, especially engine cooling radiators and air-conditioning evaporators.

At the present time, heat exchangers for automobiles are formed by a bundle of parallel tubes arranged in a row or sometimes several rows, these tubes being intended for the circulation through the heat exchanger of a heat-transfer fluid or coolant, such as water to which glycol has been added in the case of engine cooling radiators. In this example, the coolant, for cooling the engine components, heats up and must in turn be cooled. It is the role of the radiator to provide this function. For this purpose, the fluid to be cooled is made to circulate in the tubes of the radiator and is cooled by heat exchange with the cool air, the heat exchange taking place via heat exchange elements placed in the tube bundle.

Another assembly technique is the brazing of generally flat tubes to heat-exchange elements consisting in this case of fins placed between the tubes. Usually, these fins are formed with a corrugated surface and are brazed to the large faces of the tubes at the tops of the corrugations.

The flat tubes used in this assembly technique are obtained by folding, extrusion or electric welding.

In this type of heat exchanger assembled by brazing, the components to be brazed—tubes or fins—are made of a base material, or core material, which is generally an aluminum alloy chosen from the 1xxx, 3xxx, 6xxx or 7xxx series, the melting point of said alloy between 630 and 660° C.

In the case of folded or electric-welded tubes, the core material is covered, on one or both large faces of the tubes, with a filler metal made of a 4xxx series aluminum alloy, the melting point of which is above 577° C. but below the melting point of the core metal. This filler metal constitutes the actual brazing layer. In the case of extruded tubes, the filler material is deposited on the fins and not on the tubes. This difference is irrelevant in the case of the invention, as it applies in the same manner to all tube manufacturing techniques.

Basically, the process for brazing a heat exchanger consists in assembling the various constituent parts and then, after various treatments, especially a drying treatment, in placing the assembly in a brazing furnace in which the temperature is raised up to the melting point of the brazing layer.

To avoid the formation of alumina, the brazing is carried out in an inert nitrogen atmosphere in what is called a CAB (controlled atmosphere brazing) furnace.

However, it has been established that, in order to obtain a perfectly sealed high-quality heat exchanger, there is an advantage in applying an additional layer, of what is called a brazing flux, to the filler material.

The base material constituting the brazing flux is a potassium aluminum fluoride ($K_2AlF_5$, $KAlF_4$ or $K_3AlF_6$). Its melting point is below the minimum melting point of the filler metal. There are several benefits of this brazing flux:

firstly, as the temperature of the heat exchanger rises in the CAB furnace, the brazing flux melts first and dissolves the natural alumina present on the parts of the heat exchanger;

secondly, the brazing flux, after it has dissolved the alumina, increases the wettability of the aluminum, thereby preparing the surface of the parts to be brazed, facilitating the movement of the filler material which, in the molten state, fills the assembly gaps by capillary effect, thus obtaining a perfectly sealed heat exchanger; and finally, the brazing flux prevents the parts from reoxidizing during the brazing itself.

A known method for depositing the brazing flux is to cover all the parts of the heat exchanger, after or possibly before assembly, with a flux/water mixture by immersion in a bath, by spraying, by coating or by application using a brush. The main drawbacks of this method are, on the one hand, an excessive consumption of brazing flux, since only a small part of the total surface covered with flux is actually useful, namely about 5%, and, on the other hand, the requirement for the parts to be perfectly dried before brazing so as to prevent the aluminum from being oxidized by the water contained in the mixture deposited. It is therefore necessary to carry out a blowing operation so as to remove some of the water present in the heat exchanger, especially at points where water can be easily retained, such as the inside of the corrugations of the fins.

Other methods for applying the brazing flux are known from the prior art.

Japanese Patent Application No. 2000061629 discloses a process that consists in depositing a bead of flux at the tops of the fins. However, this process has mechanical assembly problems due to the additional thickness introduced by the bead of flux. As a result, it is more difficult to insert the fins between the tubes and higher compression has to be applied in order to achieve the final dimensions of the heat exchanger.

The process disclosed in British Patent Application No. 2 334 531 consists in coating the large face of extruded flat tubes with flux. However, the amount of brazing flux to be used still remains very large.

Finally, Japanese Patent Application No. 2004025297 suggests completely dispensing with brazing flux by the use of core and filler materials that contain magnesium in well-defined proportions. However, these materials have the drawback of requiring furnace techniques with a high degree of is atmosphere control ($O_2$ content <10 ppm).

Thus, the object of the invention is to provide a process for brazing flat tubes, for circulation of a coolant, and fins, for circulation of air, intended for exchanging heat with said coolant in a heat exchanger which makes it possible to very significantly reduce the amount of brazing flux to be deposited and to dispense with the blowing operation, without correspondingly inducing mechanical drawbacks at assembly and while still using inexpensive standard materials.

This objective is achieved, in accordance with the invention, by the fact that said process includes an operation consisting in depositing a layer of brazing flux on one side of one edge of said flat tubes.

Thus, it will be understood that, as the temperature in the CAB furnace rises, the brazing flux melts and spreads by gravity over the large faces of the tubes and therefore into the areas of contact with the fins. As will be seen in greater detail later, the deposited flux density along the tubes may be calculated by taking into account the height of the tubes, thereby making it possible to adjust the amount of flux to be used to the strict minimum necessary.

It should be noted that the tubes and fins employed in the invention may be made from standard materials, such as the above-mentioned aluminum alloys.

In addition, placing the brazing layer in a region of the tubes lying on an external face at the heat exchanger has no deleterious mechanical effect as regards assembly, unlike in certain known processes.

According to one embodiment, said layer of brazing flux is deposited on said tubes in the form of a continuous or discontinuous bead. For example, said deposition is carried out by means of a syringe, a metering valve, a patterned or unpatterned roller or a brush, or by microspraying.

According to another embodiment, said layer of brazing flux is deposited on said tubes by screen printing.

In all cases, the invention does not require the brazing flux to be used in the form of an aqueous solution, with the advantageous consequence that the blowing step, still essential in the known processes, may in this case be omitted.

It should also be emphasized that it does not matter whether the layer of brazing flux is deposited on one side of the edge of the tubes or on the other, since the invention provides for said layer of brazing flux to be deposited on the external side of the edge of the flat tubes, said fins being placed on the outside of said tubes, or on the internal side of the edge of the flat tubes, said fins being placed on the inside of said tubes.

The invention also has many other advantages:
firstly in the case of louvered fins, there is no risk of the fins being blocked by recrystallized flux residues after brazing;
secondly, the invention may be implemented on surfaces that have not been degreased, unlike in the processes using a flux in aqueous solution which require prior degreasing.

Finally, the invention relates to a heat exchanger, noteworthy in that it comprises flat tubes and fins that are brazed in accordance with the process according to the invention.

The following description in conjunction with the appended drawings, given by way of nonlimiting examples, will make it clearly understood what the invention comprises and how it can be realized.

Figure 1:
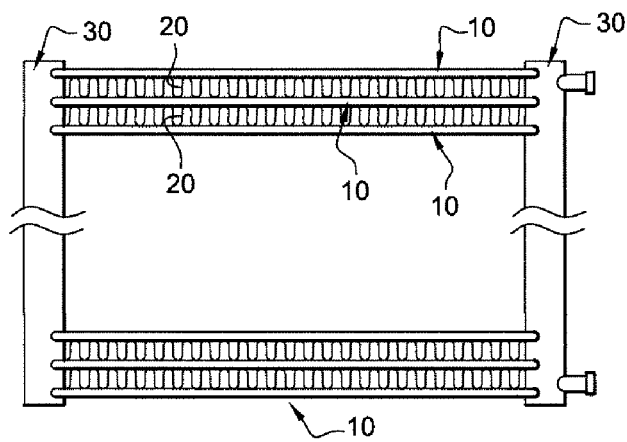
FIG. 1 is a partial side view of a heat exchanger according to the invention.

FIG. 1 shows a heat exchanger comprising flat tubes 10 produced by folding, extrusion or electric welding, placed so as to be mutually parallel via their large plane faces 12 and separated by corrugated fins 20, the tops of the corrugations being in contact with the large faces of the tubes 10.

The flat tubes 10 have two large plane faces or large sides 12 and two edges or short sides 11.

In the case of a radiator, the glycol water to be cooled flows vertically downward inside the tubes 10 from the header 30, while air is blown into the fins 20 in a direction perpendicular to the plane of FIG. 1. Heat exchange between the water and the air takes place via the fins 20 and the walls of the large faces 12 of the tubes 10.

As mentioned above, the tubes 10 and the fins 20 are made of an aluminum alloy core material covered, for the purpose of brazing, with a filler material, also made of an aluminum alloy.

Figure 2:
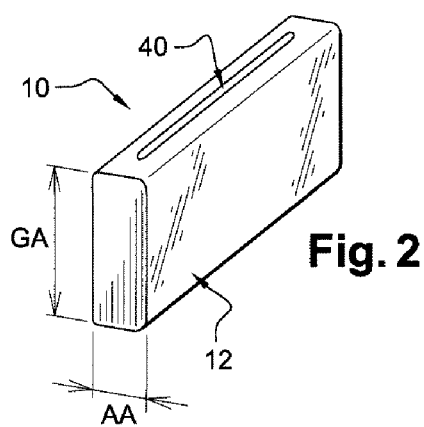
FIG. 2 is a perspective view of a flat tube of a heat exchanger of FIG. 1, which includes a layer of brazing flux.
Figure 3:
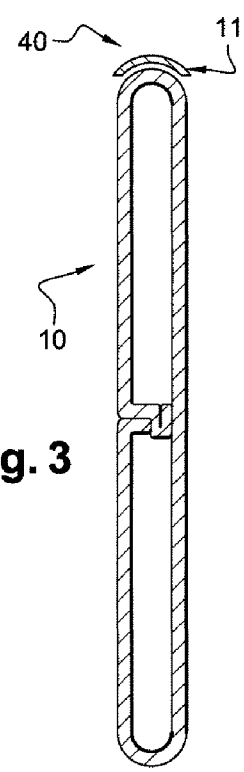
FIG. 3 is a front view of the tube of FIG. 2.
Figure 4:
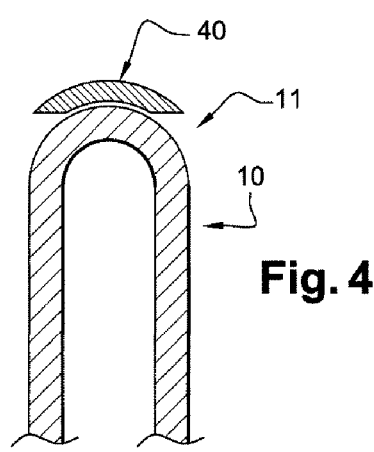
FIG. 4 is a detailed view of the edge of the tube of FIG. 3.

To dissolve the natural alumina on the various parts and to prevent alumina formation during brazing, and also to promote the action of the filler material, FIGS. 2 to 4 show that a layer of brazing flux 40 is deposited on one side, here the external side, of one of the two edges 11 over the entire length L of the tubes 10. Of course, if the fins are placed on the inside of the tubes and not on the outside, as in FIG. 1, the layer of brazing flux is then deposited on the internal side of the edge 11 of the tubes.

The layer 40 of brazing flux may be deposited on the edge 11 of the tubes 10 after the heat exchanger has been assembled. In other words, brazing flux is deposited only on an edge of a flat tube or, in other words, only on one of the two short sides 11 of the flat tube 10.

In the example shown, the tube 10 is in an approximately vertical orientation and the amount of flux sufficient to allow the flux to migrate along the large sides 12 under gravity and/or capillary effect is deposited on one of the short sides.

In one embodiment (not shown), the flat tube 10 is slightly inclined to the vertical.

The layer 40 is therefore deposited either in the form of a continuous or discontinuous feed by means of a syringe, a brush or a metering valve, or by microspraying or by coating with a patterned or unpatterned roller, or else by screen printing by means of a mask placed on the sidewall of the heat exchanger shown in FIG. 1, this mask being perforated with parallel slots level with the edges of the tubes 10.

The layer 40 may also be deposited on the tubes while they are being formed.

In general, the brazing flux used is a mixture of 35 to 60% by weight of a flux material, 5 to 15% by weight of N-methyl-2-pyrrolidone, to ensure that the flux adheres to the tubes, 5 to 15% by weight of 2-butoxyethanol, to reduce the rate of sedimentation of the flux, enabling the process to be carried out reliably and reproducibly, and 15 to 50% of demineralized water. These examples of the proportions are in no way limiting.

In particular, the Applicant has carried out trials with a brazing flux consisting of: 45% Nocolok 100 (registered trademark) flux; 10% N-methyl-2-pyrrolidone, 10% 2-butoxyethanol; and 35% demineralized water. These examples of the proportions are in no way limiting.

The greater the height H of the tube 10, the higher the density per unit area Y of flux to be deposited over a width A of the edge 11 must be in order for the flux, upon melting, to be able to cover all of the large faces 12 of the tubes.

The density per unit area Y of flux to be deposited may be determined in the following manner.

If D is the average density per unit area of flux on the exchange surface of the tubes, the mass of flux to be used for one tube is given by:

$$X=2.D.L.H$$

Advantageously, D ranges from 0.5 to 8 g/m². Thus, taking D=3 g/m², L=200 mm and H=30 mm, the value of X obtained is X=0.036 g.

The density per unit area Y sought is:

$$Y=X/(A.L)$$

i.e. Y=180 g/m² for A=1 mm.

The invention claimed is:

1. A process for brazing flat tubes (10), said process comprising depositing a layer (40) of brazing flux on one side of an edge (11) of the flat tubes (10), and subsequently melting and spreading the brazing flux by gravity over a large face of the tube.

2. A process according to claim 1, in which the flat tubes (10) are brazed with fins (20).

3. A process according to claim 2, in which the layer (40) of brazing flux is deposited on the external side of the edge (11) of the flat tubes (10), with the fins (20) being placed on the outside of the flat tubes (10).

4. A process according to claim 2, in which the layer (40) of brazing flux is deposited on the internal side of the edge (11) of the flat tubes (10), with the fins (20) being placed on the inside of the flat tubes (10).

5. A process according to claim 3, in which the layer (40) of brazing flux is deposited while the flat tubes (10) are being formed.

6. A process according to claim 3, in which the layer (40) of brazing flux is deposited after a heat exchanger comprising the flat tubes (10) has been assembled.

7. A process according to claim 1, in which the layer (40) of brazing flux is deposited on the flat tubes (10) in the form of a continuous or discontinuous bead.

8. A process according to claim 7, in which the deposition is carried out by means of a syringe, a metering valve, a patterned or unpatterned roller, or a brush, or by microspraying.

9. A process according to claim 1, in which the layer (40) of brazing flux is deposited on the flat tubes (10) by screen printing.

10. A process according to claim 1, in which the average density per unit area (D) of brazing flux on an exchange surface of the flat tubes (10) is from 2.8 to 8 $g/m^2$.

11. A heat exchanger comprising flat tubes (10) and fins (20) that are brazed in accordance with the process of claim 1.

12. A process according to claim 4, in which the layer (40) of brazing flux is deposited while the flat tubes (10) are being formed.

13. A process according to claim 4, in which the layer (40) of brazing flux is deposited after a heat exchanger comprising the flat tubes (10) has been assembled.

14. A process according to claim 1, in which the brazing flux is a mixture that includes 5 to 15% by weight of 2-butoxyethanol to reduce the rate of sedimentation of the flux, enabling the process to be carried out reliably and reproducibly.

* * * * *